Sept. 27, 1960     E. P. LARSH ET AL     2,954,177
WINDING MACHINE

Filed Feb. 3, 1958                                       7 Sheets-Sheet 1

INVENTOR.
EVERETT P. LARSH
THEODORE R. BLACK, SR.
BY
ATTORNEYS

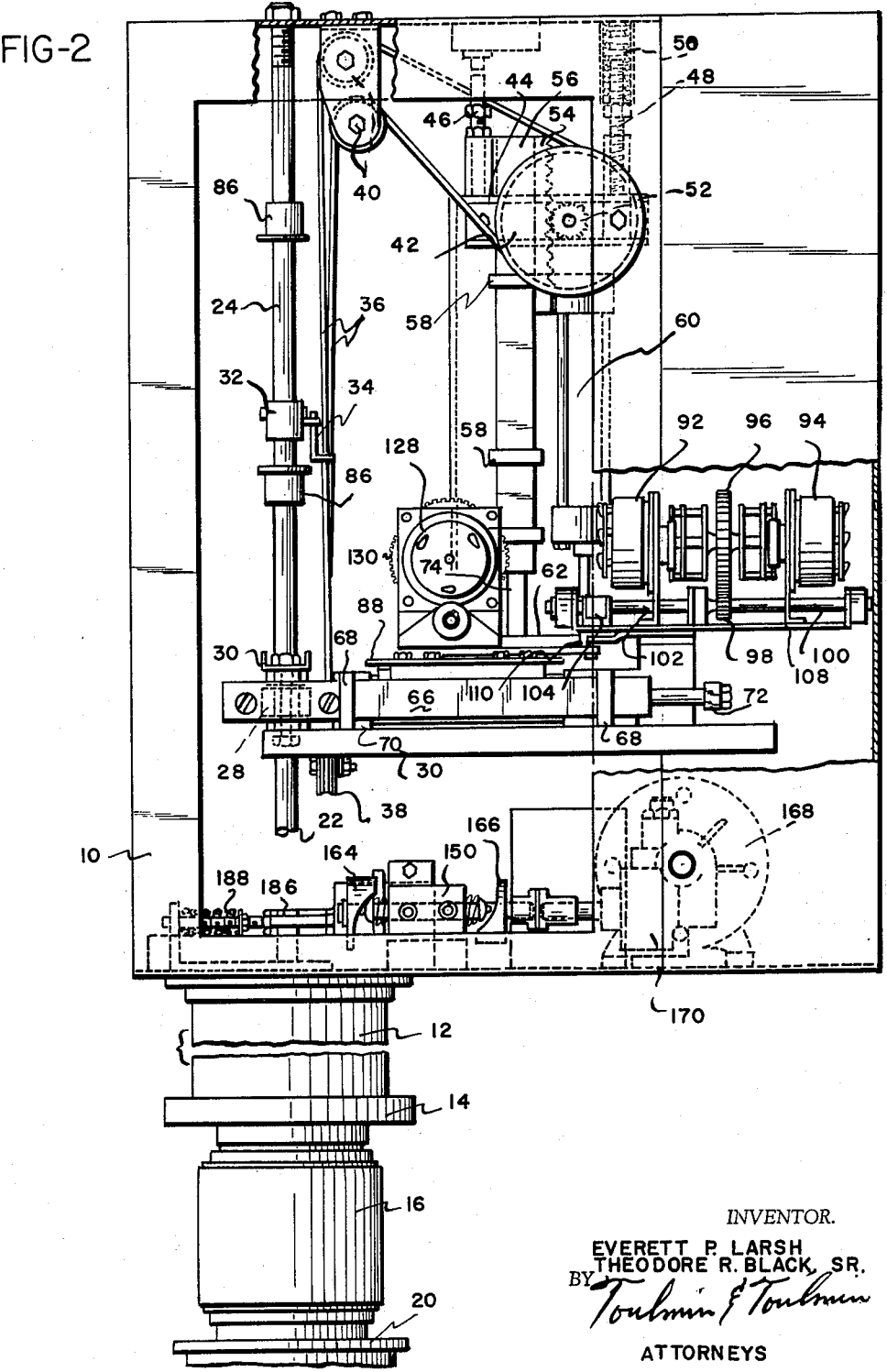

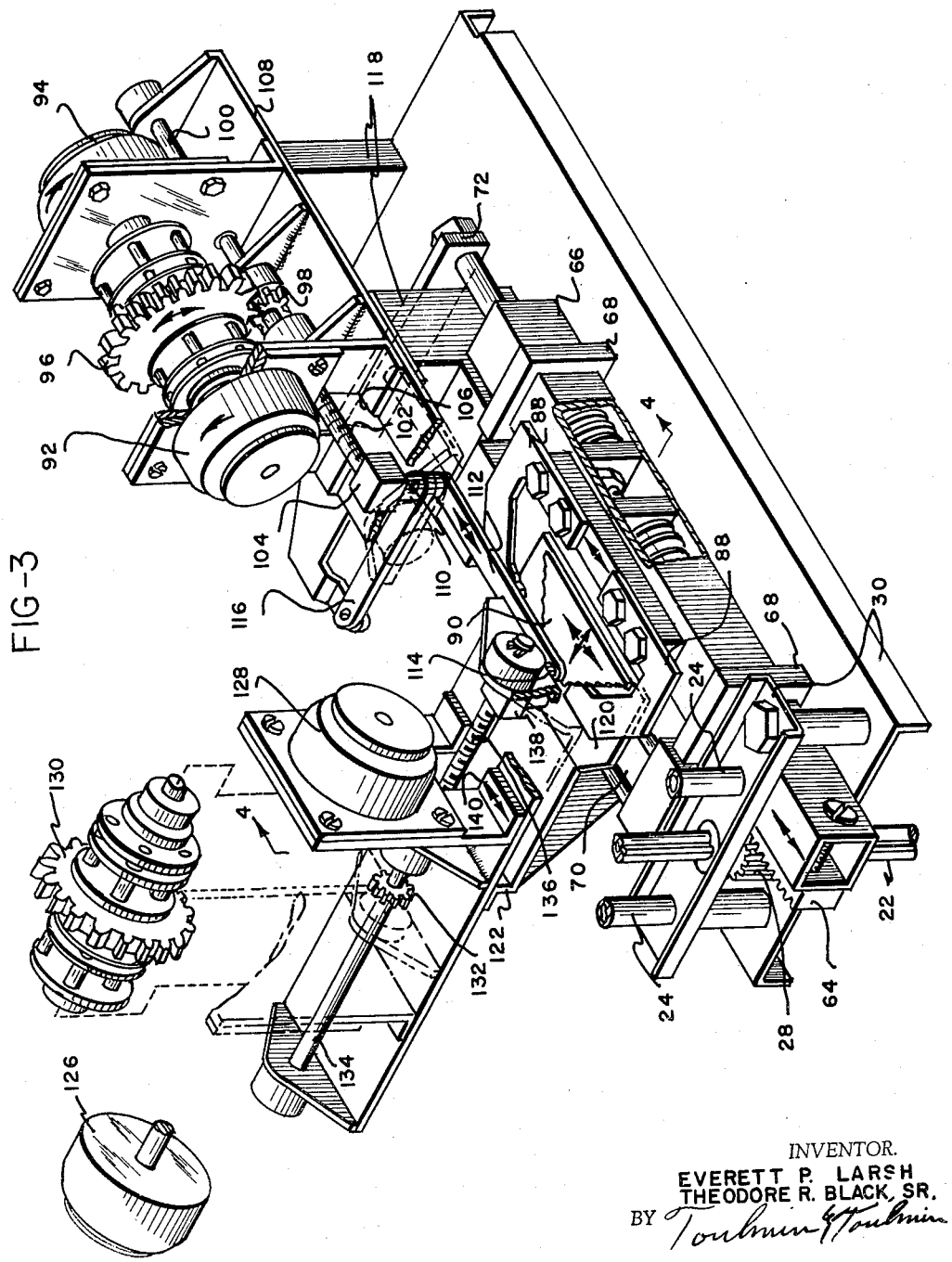

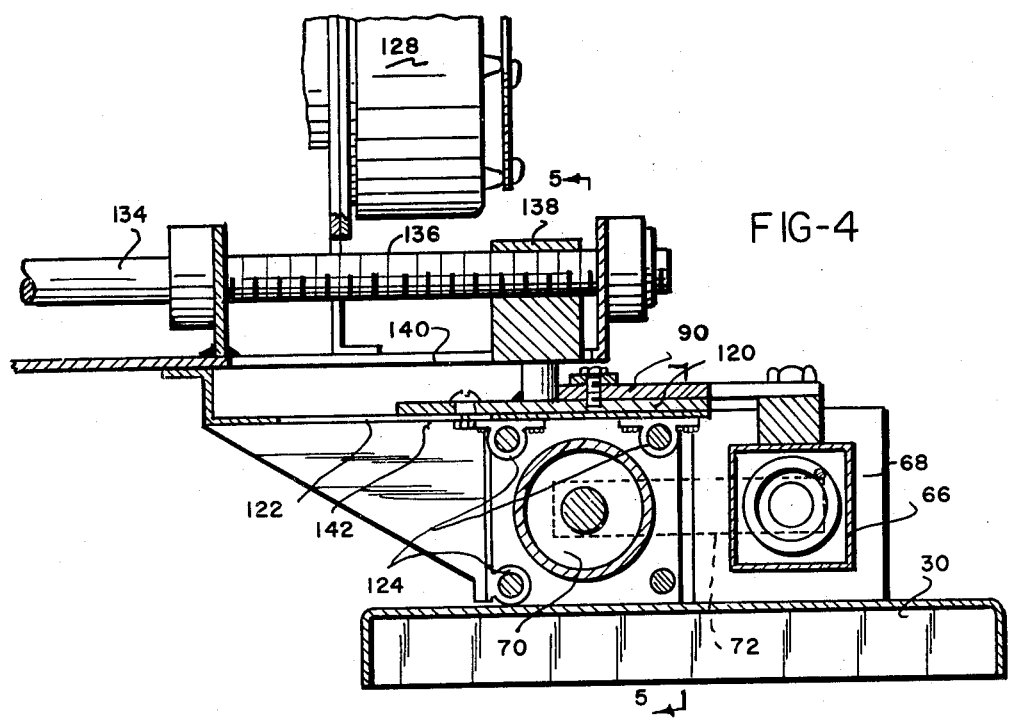
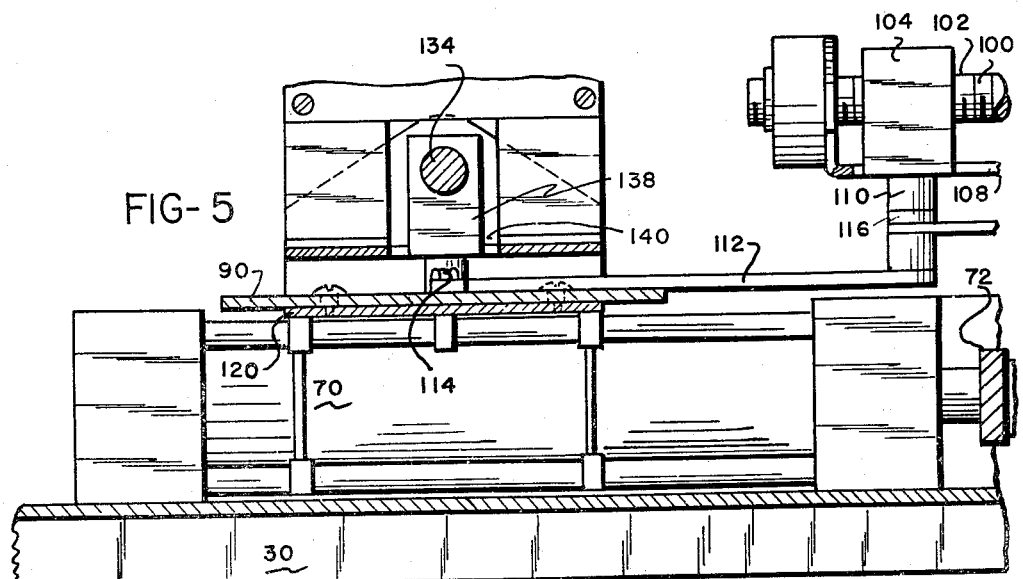

Sept. 27, 1960   E. P. LARSH ET AL   2,954,177
WINDING MACHINE
Filed Feb. 3, 1958   7 Sheets-Sheet 5
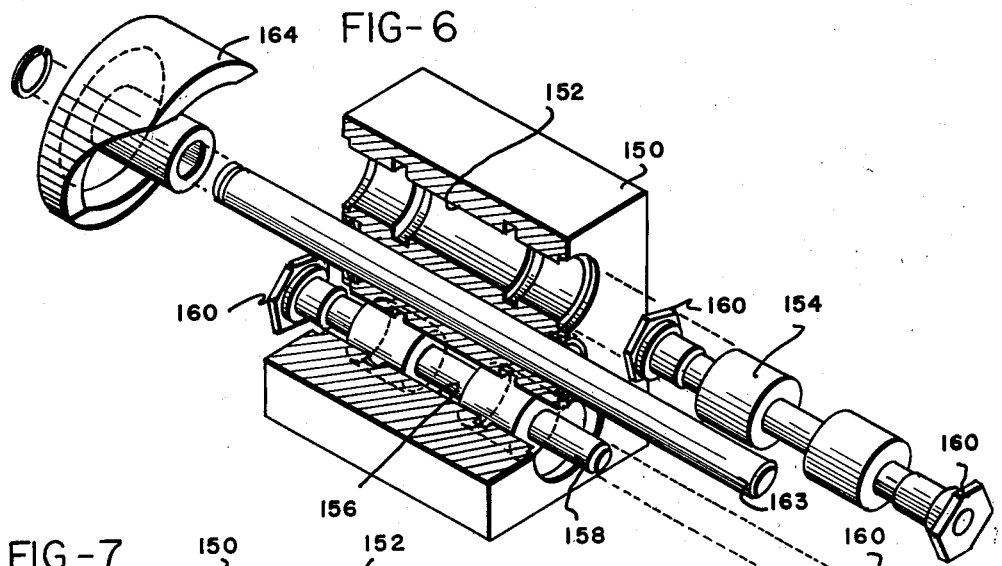
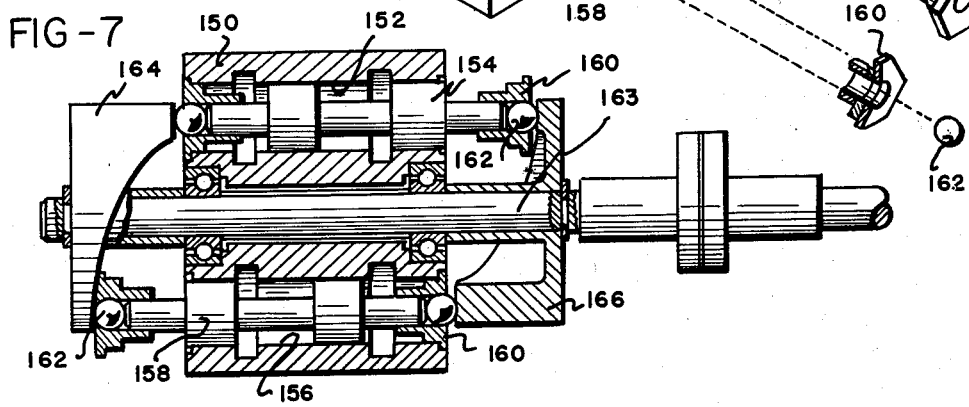
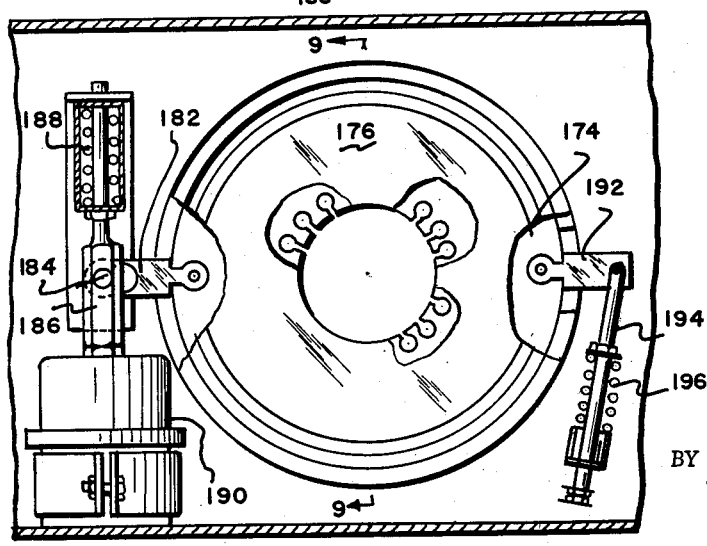
INVENTOR.
EVERETT P. LARSH
BY THEODORE R. BLACK, SR.
ATTORNEYS Sept. 27, 1960 E. P. LARSH ET AL 2,954,177
WINDING MACHINE Filed Feb. 3, 1958 7 Sheets-Sheet 7

INVENTOR.
EVERETT P. LARSH
THEODORE R. BLACK, SR.
BY

ATTORNEYS

United States Patent Office 2,954,177
Patented Sept. 27, 1960

2,954,177

WINDING MACHINE

Everett P. Larsh, 124 E. Monument Ave., Dayton, Ohio, and Theodore R. Black, Sr., Dayton, Ohio; said Black, Sr., assignor to said Larsh Filed Feb. 3, 1958, Ser. No. 712,786

10 Claims. (Cl. 242—1.1)

This invention relates to a winding machine, and particularly to a winding machine for winding electric motor armatures and stators.

In a co-pending application Method and Apparatus for Winding Coils, Serial No. 702,108, filed December 11, 1957, there is disclosed a winding head for electric motor stators and armatures in which the winding of the stator or armature is accomplished by reciprocating and oscillating the winding head and the magnetic frame being wound relatively and which relative motion causes wires led through the winding head to be deposited on the said frame as coils.

Particularly in the case of stators, the coils deposited on the magnetic frame vary in size and position whereby the coils are distributed about the stator frame thereby to provide for a suitable field form and efficient use of the magnetic material of the frame and of the wire applied thereto.

The particular object of the present invention is the provision of a simple improved machine for accomplishing the relative reciprocation and oscillation above referred to, that takes place between a winding head and a magnetic frame member being wound thereby.

Another object of the present invention is the provision of a novel adjustable control mechanism by means of which the amount and position of the relative oscillation can be controlled whereby the location and size of the coils wound on the frame member can be controlled.

A still further object of this invention is the provision of a winding machine of the nature referred to, especially adapted for use in automatic production lines.

Another object is the provision of a winding machine having a greatly simplified control mechanism for controlling the entire cycle of operation thereof.

It is a still further object of this invention to provide a winding machine of the nature referred to as readily adaptable to use with armatures and stators of substantially any size and type.

Figures 1, 17:
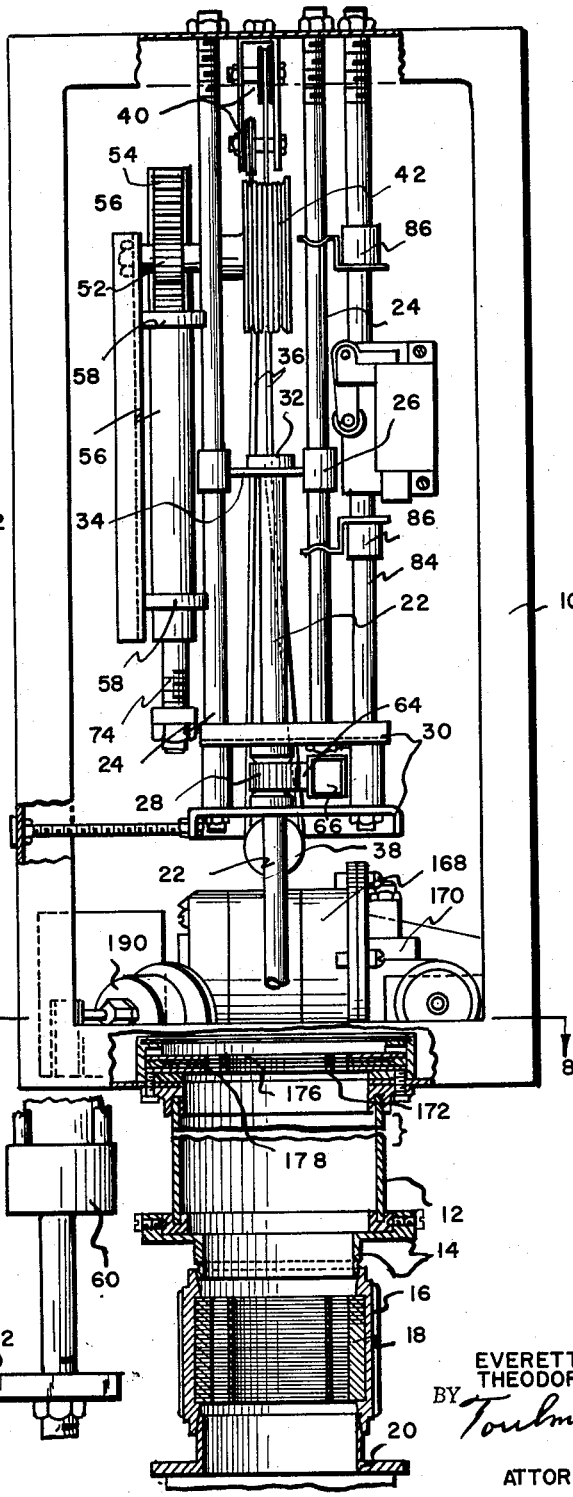
Figure 9:
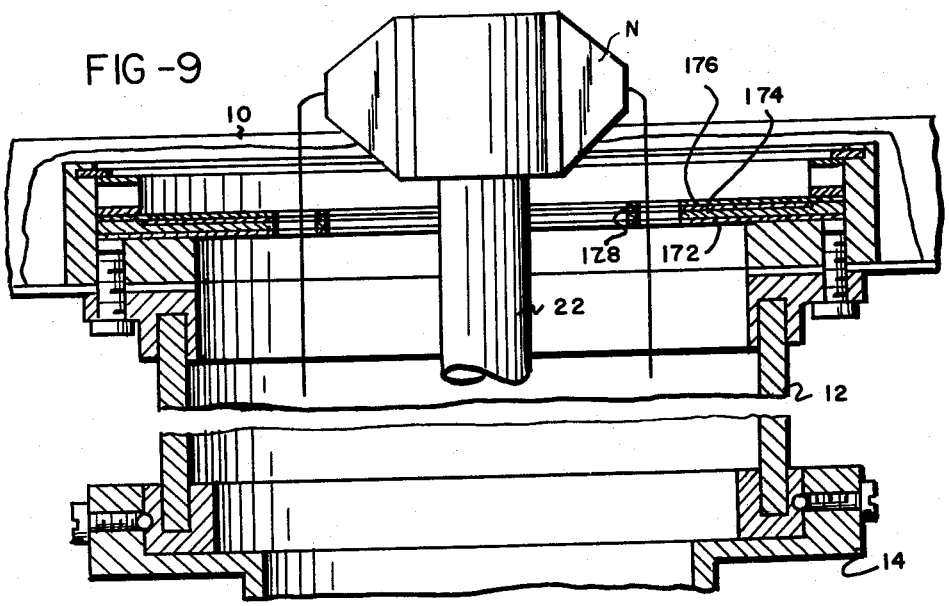
Figure 10:
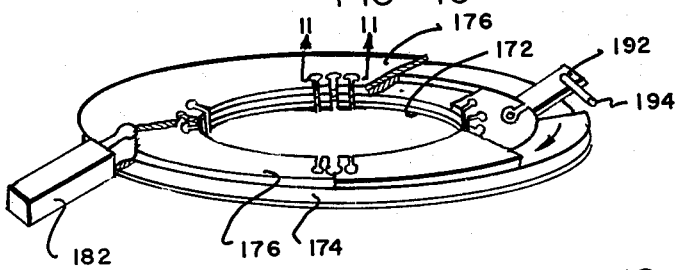
Figure 11:
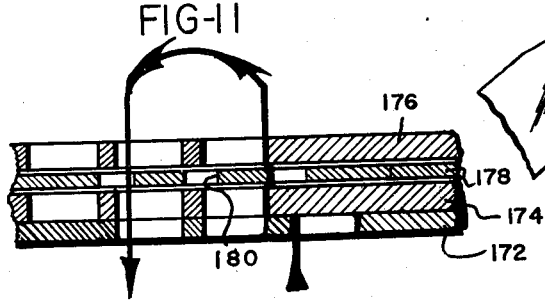
Figure 12:
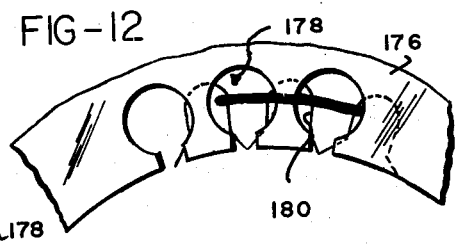
Figure 13:
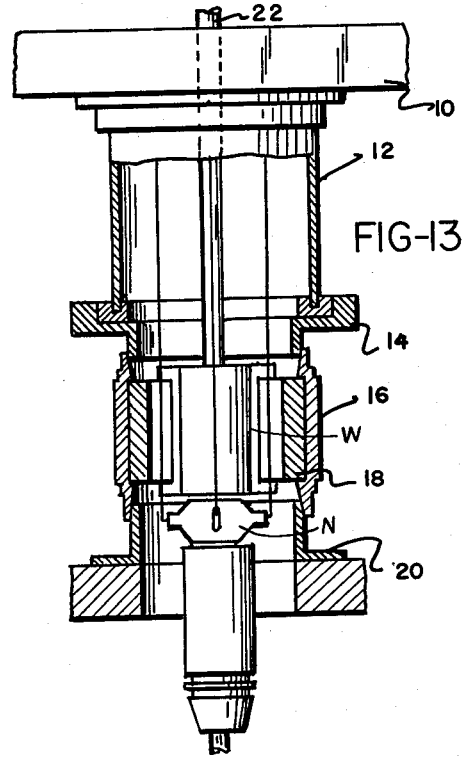
Figure 13A:
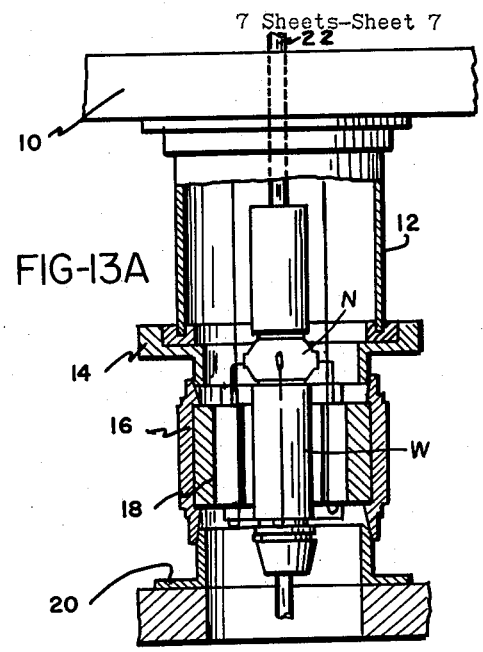
Figure 16:
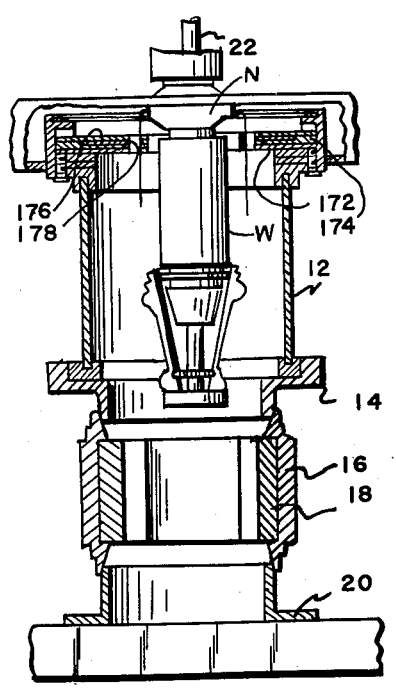
Figure 14:
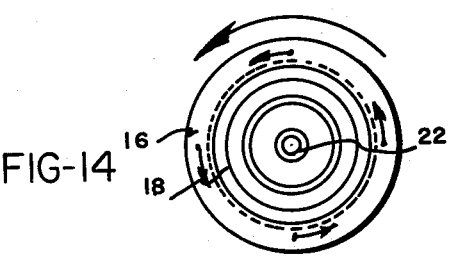
Figure 15:
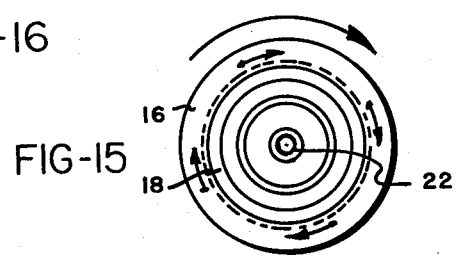

These and other objects and advantages will become more apparent upon reference to the accompanying drawings, in which:

Figure 1 is a front elevational view showing a winding machine according to the present invention but with the winding head removed therefrom and with a stator frame in position to be wound, Figure 2 is a side view looking in from the left side of Figure 1 with parts of the frame of the machine broken away to show the construction thereof, Figure 3 is a perspective view showing somewhat diagrammtically the novel control arrangement of the present invention by means of which the position and the length of the oscillating stroke of the winding head associated with the machine can be varied, Figure 4 is a sectional view indicated by line 4—4 on Figure 3 showing the mechanism pertaining to the adjustment of the length of the oscillating stroke, Figure 5 is a sectional view indicated by line 5—5 on Figure 4 showing details of construction pertaining to the adjustment of the position of the oscillating stroke, Figure 6 is a perspective view showing a valve mechanism associated with the hydraulic motor by means of which the winding machine drives the winding head and the magnetic frame being wound in relative reciprocation and oscillation, Figure 7 is a sectional view taken through the valve of Figure 6 showing the relationship of the individual valves that control the reciprocation and oscillation, Figure 8 is a plan section indicated by line 8—8 on Figure 1 showing the mechanism for clamping and cutting off the wires leading to the winding head so that after a winding operation, the winding head can be retracted, the wires cut off, and the wound frame removed from the winding machine, Figure 9 is a vertical section indicated by line 9—9 on Figure 8 showing the arrangement of the clamping and cut off plates therein, Figure 10 is a perspective view showing the arrangement of the clamping and cut off mechanism, Figure 11 is a developed sectional view indicated by line 11—11 on Figure 10 showing a wire cut off and clamped and with the wire feed nozzle from which the wire extends again advancing to commence a new winding operation, Figure 12 is a plan view looking down on top of Figure 11 showing how the construction of the clamping and cut off mechanism provides ample clearance for passage of the nozzle in the actuated position of the mechanism, Figure 13 is a more or less diagrammatic view showing the winding head in a position where the nozzles thereof have advanced completely through the stator frame, Figure 13-A is a view like Figure 13 but shows the nozzles after they have been retracted through the stator frame so that at least a portion of a coil has been deposited by each feed nozzle on the stator frame, Figure 14 is a plan view showing the relative motion that takes place between the winding head and the stator frame when the nozzles are in their Figure 13-A position, Figure 15 is a view like Figure 13-A but shows the direction of relative rotation between the winding head and the stator frame when the nozzles are in their Figure 13 position, Figure 16 is a more or less diagrammatic view showing the position of the winding head immediately prior to advancing it into a stator frame to be wound or immediately after it has been retracted from a wound stator frame, and Figure 17 is a sectional view taken through one of the actuating slides for the racks that cause the relative reciprocation and oscillation between the winding head and the member being wound.

Referring to the drawings somewhat more in detail, the winding head, according to the present invention, comprises an arrangement for variably relatively reciprocating a winding head and a member to be wound thereby. The reciprocation and oscillation could be carried out by either one or the other of the winding head and member to be wound, or the motions could be divided between the winding head and member so that each thereof took a part of the total relative movement. In the modification particularly illustrated and described in the present application the entire movement is taken by the winding head, but it will be understood that the showing is merely exemplary and that it is intended to include in the scope of the present invention any manner of obtaining relative reciprocation and oscillation between the winding head and the member being wound.

Similarly, there is specifically disclosed and described an arrangement for winding electric motor stators, but since electric motor armatures are wound in substantially the same manner, the present invention includes within its purview the operating of armatures as well as stators.

The particular machine illustrated comprises a framework 10 and this framework at the bottom comprises a tubular projection 12 terminating at its outer end in a ring 14 adapted for seating against the upper end of the outer frame part 16 of a motor stator which comprises the slotted magnetic core part 18 which is to be provided with coils.

A lower support 20 engages the lower end of frame 16 and thus supports the stator fixedly in a predetermined position. The lower support 20 may be reciprocable in the vertical direction to accomplish the clamping of the stator in place and to permit removal thereof when completely wound. A preferred arrangement would have the lower member 20 mounted on a turret or reciprocating or oscillating carrier so that immediately upon completing the winding of one stator, another could be indexed or shoveled into working position and a new winding operation commenced.

Within frame 10 in axial alignment with the axis of the bore through the stator is a shaft 22 which is slidably supported on the vertical guide rods 24 as by the bearing sleeves 26 so that shaft 22 can be moved in reciprocation on the axis of the stator being wound. Shaft 22 at its lower end is adapted for receiving and supporting a winding head generally indicated at W in Figures 13, 13–A and 16.

The shaft 22 is slidably keyed to a gear 28 which is retained between stationary plates 30 located within the frame. Gear 28 is operable for driving shaft 22 in rotation while the slidable key connection between the gear and the shaft permits reciprocation of the shaft through the gear.

Reciprocation of the shaft 22 is accomplished by an arrangement best seen in Figures 1 and 2. The shaft 22 has a collar 32 thereon, and pivotally carried to the collar is a bracket 34 that is attached to one reach of a cable 36 that extends generally vertically parallel with shaft 22 and about an idler pulley 38 supported on the bottom one of plates 30. Both reaches of the cable from idler pulley 38 pass upwardly and about a pair of idler pulleys 40 carried in a bracket toward the top of the frame 10 of the machine and then pass to a larger pulley 42 and wrapped several times about the pulley 42 so as to be in slipfree relation thereto. The two reaches of the cable join on pulley 42 so that a single cable loop is had. An intermediate point of the cable or the ends of the two reaches could be positively connected to the pulley 42, if desired.

Pulley 42 is carried in a frame 44 that is adjustable in frame 10 as by the adjusting screws 46 and 48, and pertaining to one of the adjusting screws there may be a compression spring 50 which maintains the cable 36 taut at all times.

Fixed on the supporting shaft for pulley 42 is a pinion 52 that is engaged by a rack 54. Rack 54 is mounted on a slide 56 guided for vertical movement in a guide means 58 and adapted for being actuated by a fluid motor 60 through a connection 62 between the ram of the fluid motor and the said slide. It will be evident that reversible actuation of fluid motor 60 will be accompanied by reciprocation of slide 56 and of rack 54 whereby reversibly to rotate pinion 52 and pulley 42 thus driving cable 36 in such a manner as to cause vertical reciprocation of shaft 22.

In a similar manner, pinion 28 is engaged by a rack 64 mounted on a slide 66 reciprocable in guide means 68 adapted for being driven in reciprocation by a fluid motor 70 through a connection 72 between the ram of the motor and one end of the slide.

Since the reciprocation and oscillation of the winding head is of a variable nature, particularly the oscillation, it is advisable for there to be means provided for preventing overtravel of the shaft 22 in either reciprocating or oscillating movements while still permitting the use of fixed stroke motors for causing movement of the shaft. According to the present invention this is accomplished by making each of the slides 56 and 66 of a special nature so as to be yieldable lengthwise as illustrated in Figure 17.

In Figure 17 it will be noted that the slide therein illustrated, namely, slide 56 has a shaft or rod 74 extending into the end thereof opposite its connection with rack 54. Shaft or rod 74 is threaded at its inner end and carries adjustment nuts 76 thereon, each of which is provided with lock nut means 78. Adjacent each end of the slide 56, and which is a rectangular hollow member, is a spring retainer 80 and between each spring retainer and the adjacent adjusting nut there bears a compression spring 82. The arrangement is such that the slide will take the full movement imparted to shaft or rod 74 by its actuating motor unless the rack mounted on the slide meets resistance through the pinion it drives, and when this occurs the slide will halt while movement of shaft or rod 74 will continue and the overtravel will be accompanied by compression of one or the other of the springs 82 with simultaneous expansion of the other of spring 82. In this manner fixed stroke motors can be employed and adjustable stops provided for the shaft 22 and the proper amount of reciprocation and oscillation thereof will automatically follow. The resilient connections formed by the springs 82 thus form resiliently expansible and collapsible elements connecting the fixed stroke actuating motors to the members they drive.

As an example of the manner in which the reciprocation of shaft 22 can be controlled, there can be a rod 84 provided in the frame on which are mounted spaced stop members 86 adapted for engagement by one of the sleeves 26 attached for movement with shaft 22. Stops 86 will predetermine the maximum travel in reciprocation of shaft 22.

The controlling of the oscillation of shaft 22 is a more important matter because ordinarily there will be a great many stators or armatures wound in succession in which the length of the reciprocatory movement of the winding head relative to the member being wound will be the same thereby requiring only infrequent adjustments of the reciprocatory stroke of the winding head. However, in substantially every case where a member is being wound, there will be a variation in the amount and location of the oscillatory movement of the winding head during a winding operation on a single member being wound.

The arrangement provided in the present invention for varying the amount and location of the oscillation of the shaft 22, and, therefore, of the winding head, is illustrated in Figures 3, 4 and 5.

In these figures it will be noted that there is attached to the top of slide 66 a pair of generally C-shaped stop fingers 88 which are adapted for alternate engagement with opposite edges of a movable abutment plate 90. The opposite side edges of the abutment plate 90 are inclined for a point to one side of the plate and the edges are stepped so as to form substantially right angled points of abutment for engagement by the stop fingers 88. By changing the position of the abutment plate in directions either parallel with the direction of movement of slide 66 or at right angles thereto, both the region in which the oscillation of shaft 22 takes place and the extent of the oscillation can be varied.

The adjustment of the abutment plate in a direction parallel with the direction of movement of slide 66 is accomplished by a rotary solenoid operated mechanism consisting of the two opposite acting solenoids 92 and 94 which are operable when energized to actuate through rachet mechanisms a gear 96. By repetitive energization of one of the solenoids 92 or 94 the gear 96 can be indexed through any desired angle.

Gear 96 engages a gear or pinion 98 which is attached to a rod 100 which has screw threads along a portion of the length thereof as at 102. The screw threaded portion 102 of rod 100 is threaded through a nut 104 slidable in slot 106 in the supporting plate 108 for the rod and solenoids and the remainder of the mechanism. The nut 104 has connected therewith a pin or stud 110 which extends downwardly and is pivotally connected with a link 112 that extends over to and is connected with a point on abutment plate 90 near the peak end thereof and which is indicated at 114 in Figure 3. A link 116 may be provided between plate 108 and nut 104 to support the nut against rotation as rod 100 is being rotated in one direction or the other.

It will be apparent that by suitably supporting plate 108 stationarily, as by the blocks 118, the rotary solenoids 92, 94 can be availed of for shifting abutment plate 90 in a direction parallel with the direction of movement of slide 66 and which adjustment of abutment plate 90 will change the region in which the oscillation of the winding head takes place.

To support and guide the abutment plate during this movement, it is mounted on a support plate 120 which, in turn, is slidably supported on a frame 122 for movement at right angles to the direction of movement of slide 66. Frame 122 may be supported for movement parallel with slide 66 as by the supporting elements 124 which are shown as engaging tie rods pertaining to actuating the motor 70 for slide 66.

The movement of abutment plate 90 in a direction at right angles to the movement of slide 66 is accomplished by a mechanism similar to that previously described and which mechanism consists of the two oppositely acting rotary indexing solenoids 126 and 128 which are supported on the previously mentioned frame 122 and which are operable for reversibly driving gear 130 that meshes with the pinion 132 attached to a rod or shaft 134 having a threaded portion 136 threaded through a nut 138. Nut 138 is slidable in a slot 140 in the frame 122 and is attached at its lower end to the previously mentioned support plate 120 on which abutment plate 90 rests and with which the abutment plate is rigid. Plate 120 is slidably guided in frame 122 as by slot means 142 so that the abutment plate can be moved at right angles to the slide 66 by repetitive energization of one or the other of solenoids 126, 128.

From the foregoing it will be evident that means are provided for precisely locating abutment plate 90 in any selected position within the limits of movement thereof and that the plate will remain fixed in position once it has been adjusted. The plate in its adjusted positions is operative for abutting stop fingers 88 as slide 66 reciprocates thereby to control the amount of reciprocation of the slide as well as the region within which the reciprocation takes place.

From the foregoing it will be evident that shaft 22 can be given reciprocation in an amount sufficient to carry a winding head back and forth the entire length of a member to be wound, and that the shaft can be reciprocated through any desired angle thereby to determine the size of coils wound on the member while the region of the oscillation can be predetermined to determine the location of the coils being wound.

The control of the entire operation of the winding machine is effected by controlling the supply of fluid to the motors 60 and 70. These motors may be hydraulically or pneumatically operated and are arranged to be supplied by reversing valves, best illustrated in Figures 6 and 7.

In Figures 6 and 7 it will be noted that there is a valve block 150 having a first bore 152 on which is reciprocably mounted a valve member 154. Reciprocation of this valve member is operable for controlling the supply of fluid to one of motors 60 and 70 to cause reciprocation thereof.

A second bore 156 in the block has therein a valve member 158 operable when reciprocated for controlling the supply of fluid to the other of the said motors.

Each valve member has a cap 160 on each end in which is located a ball 162 and the balls are availed of for establishing antifriction engagement of the valve members with actuating cams.

The cam arrangement is illustrated in Figure 7 wherein it will be observed that there is a shaft 163 rotatably mounted in the valve block and carrying at opposite ends of the valve block the cams 164 and 166 that engage the opposite ends of the valve members 154 and 158. As the shaft 163 rotates it will be evident that the valve members will be reciprocated with each valve member dwelling for a predetermined period in each shifted position. The arrangement is such that the motor 60 driving the shaft 22 in reciprocation is actuated to the limit of its movement in one direction before the valve member controlling motor 70 becomes effective, and, thereafter, motor 70 reaches the limit of its travel thereby compelling oscillation of shaft 22 before the valve member for motor 60 again causes actuation of the said motor.

The reciprocation and oscillation of shaft 22 thus takes place alternately whereby the wire feed nozzles of the winding head traverse the member being wound completely and then perform their oscillatory movement before commencing another traverse movement.

Shaft 163 is adapted for being driven continuously in rotation by a motor 168 which drives the said shaft through the gear reduction 170. If desired, motor 168 could be made variable in speed to regulate the speed of the winding operation.

In order to carry out an automatic winding operation, it is necessary for the wires leading from the wire feed nozzles to be clamped fixedly at the beginning of a winding operation so that the wires will be pulled therefrom as the winding operation starts, and then, after the winding operation has been completed, the wires must be cut off between the wound member and the wire feed nozzles and again gripped between the point of cut off and the said nozzles.

This operation is accomplished by a gripping and cut off mechanism illustrated in Figures 8 through 12, and which is located at the bottom of frame 10 for the upper end of the cylindrical member 12. The cut off and gripping mechanism comprises a plurality of superimposed plates which are relatively movable, with two of the plates serving as shearing devices to cut off the wires, and the others of the plates serve to releasably clamp the wires.

As illustrated, the cut off and clamping mechanism consists of a stationary bottom plate 172 and a plate 174 that rests thereon. Plate 174 is connected with an uppermost corresponding plate member 176 and between plates 174 and 176 is a space occupied by a fourth plate 178. These plates are provided with apertures generally corresponding in shape to the slots in the member being wound and there being a group of the slots in the plates for each wire feed nozzle.

The plate 178 has a somewhat differently shaped aperture, as indicated at 180 in Figure 12, so as to cooperate with the slotlike openings in plates 174 and 176 on opposite sides thereof.

The actuations of the several parts to accomplish the cut off and clamping referred to are accomplished by the arrangement illustrated in Figure 8. The plates 174 and 176 have an actuating arm 182 extending therefrom which is connected by a pin 184 with plunger 186 biased in one direction by a spring 188 and adapted for being moved in the opposite direction by an air motor 190. The stroke of the air motor is sufficient for moving plates 174 and 176 at angular distance equal to the spacing between the slots thereof so that a wire passing through the slots will be severed or sheared off since the lowermost plate 172 is stationarily mounted. At the same time the wire will be clamped between the plate 178 and plates 174 and 176 because plate 178 has an arm 192 extending therefrom which is connected with a rod 194 that is urged in one direction by a compression spring 196. The compression spring 196 is sufficiently strong that the wires will be clamped between plate 178 and plates 174 and 176 when air motor 190 is actuated so that the wires will be fixedly held for the initiation of a new winding operation.

The operation of the winding machine described is diagrammatically illustrated in Figures 13 through 16. In these figures the winding head W, and which is more completely illustrated and described in my co-pending application Serial No. 702,108, is attached to the end of shaft 22 to be reciprocated and oscillated thereby.

In Figure 13 the winding head is advanced to the point that the wire feed nozzles N thereof are at the lower end of the stator. The wires leading from the wire feed nozzles are clamped at their upper ends by the clamping and cut off mechanism above described. The wires lead through the nozzles into the winding head and therefrom through the shaft 22, which is hollow for that purpose, to a point of supply. With the winding head in its Figure 13 position a relative oscillation takes place between the winding head and the stator so that end turns of the coils are put in place. Thereafter the shaft 22 and winding head W move upwardly to the position illustrated in Figure 13-A and at which time another relative oscillation and in the opposite direction takes place between the winding head and stator to apply the opposite end turns of the coils.

This operation is carried out repetitively until the proper number of turns are wound in the particular slots being wound. If other slots are to be wound at this time, the abutment plate 90 is adjusted to a new position and the reciprocation and oscillation of the winding head is again resumed to wind the new coils on the stator.

At the conclusion of the winding operation, and which may consist of the application of several coils to the member being wound, the winding head is retracted to its Figure 16 position and at which time the wires leading from the nozzles are pulled through the slots of the plates of the clamping and cut off mechanism. The air motor 190 is then operated to cause a shearing off and clamping of the wires and thereafter the wound stator can be removed and a new one put in place.

After the winding of the new stator has been commenced and at least a few turns of wire are placed in the slots being wound, the clamping and cut off mechanism can be released so that it will be in position for a new clamping and cut off operation at the proper time.

Suitable automatic controls can, of course, be provided for counting the number of turns applied to the coils and for determining the energization of the several solenoids which control the positioning of the abutment plate 90. Such automatic controls, however, form the basis of an invention not necessarily the same as the invent disclosed in the instant application.

The present invention has been illustrated in connection with the winding of a stator but it will be evident that external winding operations such as winding of coils or an armature could be carried out by the same mechanism and that substantially the only change required would be in the substitution of the proper winding head and in the provision of a suitable clamping and cut off mechanism adapted for cooperation therewith.

It will also be evident that the particular structural element of the mechanism is susceptible to considerable modification in order to make it more compact but that in general the device would retain its unitary characteristics so that it could readily be associated with other machines in an automated production line.

We claim:

1. In a winding machine; a frame, means carried by the frame for supporting a member to be wound and a winding head therefor in coaxial alignment, first motor means reversibly energizable for moving the winding head and member in relative reciprocation, second motor means reversibly energizable for driving the winding head and member in relative oscillation, at least the drive from said second motor means comprising a resiliently expansible and collapsible element, said second motor means normally providing for a greater amount of relative oscillation than is necessary, stop means between the winding head and member for limiting said relative oscillatory movement therebetween whereby the size and location of the coils being wound on said member can be determined, and means for adjusting said stop means to vary the said limits of the said relative oscillatory movement.

2. In a winding machine; means for supporting a member to be wound and a winding head therefor in coaxial relation, first motor means reversibly energizable for driving the winding head and member in relative reciprocation to carry the winding head from end to end of the said member, second motor means reversibly energizable when the winding head is at the limits of its relative reciprocation for causing relative oscillation between the winding head and member, the drive from said second motor means comprising an extensible and collapsible element, stop fingers carried by said element, and an abutment plate located between the stop fingers for engagement thereby to limit the amount of relative oscillation of the winding head and member, said abutment plate being adjustable for determining the individual limits of travel of said element thereby to determine not only the location of the coils on the member but also the size thereof.

3. In a winding machine; means for supporting a winding head and a member to be wound thereby in coaxial relation, said winding head being operable to deposit coils on the member in response to relative reciprocation and oscillation therebetween, a rotatable member for causing said oscillation, a reciprocable element for reversibly driving said rotatable member, a rod associated with said element for driving the said element, opposed springs connecting said rod with the element thereby to permit overtravel of the rod relative to said element in either direction, stop fingers carried by the element, an abutment plate located between the fingers, said abutment plate tapering generally inwardly toward one side, and means for adjusting the abutment plate in directions parallel with and at right angles to the direction of movement of said element whereby to determine the location and extent of movement of the element thereby to control said relative oscillation.

4. In a winding machine; means for supporting a member to be wound, a support for supporting a winding head in coaxial relation with the member, means for reciprocating said support to reciprocate the winding head relative to the member, means for oscillating said support in one direction at one end of its reciprocatory travel and in the opposite direction at the other end of its reciprocatory travel whereby wires fed from the winding head will be carried in the path of coils, a first fluid motor connected with the support reversibly energizable for causing the said reciprocation thereof, a second fluid motor connected with the support reversibly energizable for causing the said oscillation thereof, means including control valves operable for reversibly controlling the supply of fluid to said motors, rotary cam means operatively associated with said valves rotated in unison for controlling the valves to obtain the described operation of the said motors in predetermined timed relation, a resiliently expansible and compressible element in the connection of each said motor with said support, and adjustable stop means for limiting the travel of said support in both its reciprocatory and oscillatory movements.

5. In a winding machine; means for supporting a member to be wound, a support for supporting a winding head in coaxial relation with the member, means for reciprocating said support to reciprocate the winding head relative to the member, means for oscillating said support in one direction and one end of its reciprocatory travel and in the opposite direction at the other end of its reciprocatory travel whereby wires fed from the winding head will be carried in the path of coils, a first fluid motor connected with the support for reciprocation thereof, a second fluid motor connected with the support for the oscillation thereof, means including control valves for controlling the supply of fluid to said motors, rotary cam means for controlling the valves to obtain the described sequential operation of the said motors, resilient means in the connection of each said motor with said support, each resilient means comprising a tube connected to one of the support and motor, a rod connected to the other of the support and motor and extending into the tube, abutments on the rod, the abutments in the tube spaced outwardly from the abutments on the rod, and springs between the abutments on the rod and the abutments on the tube providing a connection between the rod and tube collapsing in both directions of movement of the rod and tube, and adjustable stop means for limiting the travel of said support in both its reciprocatory and oscillatory movements.

6. In a winding machine; a support for a winding head, means for reciprocating said support, a reciprocable element connected with the support for oscillating the support between predetermined limits, a reciprocable motor having a resilient connection with said element for reciprocating the element, and adjustable means for determining the limits of movement of said element, and, therefore, of the said support member, said adjustable means comprising a tapered abutment plate and stop fingers on opposite sides of said plate, one of said plate and fingers being mounted on said element, and means stationarily but adjustably mounting the other of said fingers and plate for movement parallel and at right angles to the direction of movement of said element whereby to vary the spacing between the plate and the fingers and to vary the location of the plate between the fingers.

7. In a winding machine; a reciprocable element, a reciprocable motor having a resilient connection with said element for reciprocating the element, a pair of spaced stop fingers carried by the element, a tapered abutment plate located between the fingers engageable thereby as the element reciprocates for determining the limits of movement of the element, a carrier for the abutment plate, and means for adjusting said carrier in the direction of movement of said element and also at right angles to the direction of movement of the said element for varying the amount of movement of the element and the region in which the said movement takes place.

8. In a winding machine; a reciprocable element, a motor for driving the element, a resilient connection between the motor and the element, spaced stop fingers carried by the element, a tapered abutment plate located between the fingers for engagement thereby, a first slide connected with the abutment plate, a second slide supporting the first slide, one said slide being supported for movement parallel to the direction of movement of the element, and the other said slide being supported on the said one slide for movement at right angles to the direction of movement of the element, and means for adjusting said slides in their respective directions of movement and for retaining the slides in their adjusted positions thereby to vary the amount and region of the reciprocation of said element.

9. In a winding machine; a reciprocable element, a motor for driving the element, a resilient connection between the motor and the element, spaced stop fingers carried by the element, a tapered abutment plate located between the fingers for engagement thereby, a first slide connected with the abutment plate, a second slide supporting the first slide, one said slide being supported for movement parallel to the direction of movement of the element, and the other said slide being supported on the said one slide for movement at right angles to the direction of movement of the element, and means for adjusting said slides in their respective directions of movement and for retaining the slides in their adjusted positions thereby to vary the amount and region of the reciprocation of said element, the said means for adjusting said slides comprising nuts connected therewith, screws threaded through the nuts, and means reversibly driving said screws.

10. In a winding machine; a reciprocable element, a motor for driving the element, a resilient connection between the motor and the element, spaced stop fingers carried by the element, a tapered abutment plate located between the fingers for engagement thereby, a first slide connected with the abutment plate, a second slide supporting the first slide, one said slide being supported for movement parallel to the direction of movement of the element, and the other said slide being supported on the said one slide for movement at right angles to the direction of movement of the element, and means for adjusting said slides in their respective directions of movement and for retaining the slides in their adjusted positions thereby to vary the amount and region of the reciprocation of said element, the said means for adjusting said slides comprising nuts connected therewith, screws threaded through the nuts, and means for incrementally reversibly driving said screws comprising rotary solenoid means, ratchet drives from the solenoid means, and gearing connecting the ratchet drives with said screws.

References Cited in the file of this patent

UNITED STATES PATENTS

| | | |
|---|---|---|
| 2,594,707 | Allen | Apr. 29, 1952 |
| 2,718,359 | Hunsdorf | Sept. 20, 1955 |